United States Patent
Krass et al.

(10) Patent No.: US 10,770,053 B2
(45) Date of Patent: Sep. 8, 2020

(54) NOISE REDUCING LIGHTING DEVICES

(71) Applicant: ABL IP HOLDING LLC, Conyers, GA (US)

(72) Inventors: Robert M. Krass, Ashburn, VA (US); Gregory Malone, Sterling, VA (US); Peter Yi Yan Ngai, Alamo, CA (US); David P. Ramer, Reston, VA (US); Rashmi Kumar Rogers, Herndon, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 96 days.

(21) Appl. No.: 15/933,523

(22) Filed: Mar. 23, 2018

(65) Prior Publication Data
US 2019/0295519 A1    Sep. 26, 2019

(51) Int. Cl.
G10K 11/162    (2006.01)
F21V 8/00    (2006.01)

(52) U.S. Cl.
CPC .......... G10K 11/162 (2013.01); G02B 6/0051 (2013.01); G02B 6/0081 (2013.01)

(58) Field of Classification Search
CPC ... G10K 11/162; G02B 6/0051; G02B 6/0081
See application file for complete search history.

(56) References Cited

U.S. PATENT DOCUMENTS

| | | | |
|---|---|---|---|
| 5,659,410 A | 8/1997 | Koike et al. | |
| 8,780,673 B2 | 7/2014 | Cohen et al. | |
| 9,851,094 B2 | 12/2017 | Gommans et al. | |
| 2001/0026626 A1 | 10/2001 | Athanas | |
| 2003/0223249 A1* | 12/2003 | Lee | G02F 1/133604 362/561 |
| 2007/0200467 A1 | 8/2007 | Heydt et al. | |
| 2009/0010477 A1 | 1/2009 | Frobisher | |
| 2011/0158420 A1 | 6/2011 | Hannah | |
| 2014/0140551 A1 | 5/2014 | Ramstein | |
| 2014/0270279 A1 | 9/2014 | Jones | |

(Continued)

FOREIGN PATENT DOCUMENTS

| | | |
|---|---|---|
| CN | 202125844 U | 1/2012 |
| KR | 20110073404 A | 6/2011 |

OTHER PUBLICATIONS

Buzzispace Acoustic Lighting Catalog, dated Apr. 28, 2017, 43 pages.

(Continued)

*Primary Examiner* — Thomas M Sember
(74) *Attorney, Agent, or Firm* — RatnerPrestia

(57) ABSTRACT

Lighting devices are disclosed. One lighting device includes a housing, a light source, and a panel. The light source is mounted within the housing and configured to emit light sufficient for general illumination of an area. The panel is supported by the housing at a location to receive light from the light source at one or more light input surfaces of the panel and output the received light from the light source via a light output surface of the panel facing the area. The light propagates within material of the panel from the one or more light input surfaces to the light output surface. The light output surface of the panel comprises a noise reduction structure.

11 Claims, 7 Drawing Sheets

(56) References Cited

U.S. PATENT DOCUMENTS

2018/0098139 A1    4/2018    Arevalo Carreno et al.

OTHER PUBLICATIONS

Thorlux Light Line Integra Acoustic Products, downloaded from the internet at http:///www.thorlux.com/luminaires/thorlux-light-line-integra-acoustic, May 3, 2018, 3 pages.
Notice of Allowance for U.S. Appl. No. 15/948,401, dated May 21, 2019, 6 pages.
Non Final Office Action for U.S. Appl. No. 15/948,401, dated Jan. 28, 2019, 24 pages.
Non Final Office Action for U.S. Appl. No. 15/974,746, dated May 21, 2020, 26 pages.
Notice of Allowance for U.S. Appl. No. 15/974,746, dated Jul. 28, 2020, 11 pages.

* cited by examiner

NOISE REDUCING LIGHTING DEVICES

TECHNICAL FIELD

The disclosed subject matter relates to lighting devices, and to configurations and/or operations thereof, whereby a lighting device includes structures for reducing noise in the area illuminated by the lighting device.

BACKGROUND

Electrically powered artificial lighting has become ubiquitous in modem society. Electrical lighting devices or luminaires, such as light fixtures or lamps, are commonly deployed, for example, in homes, buildings of commercial and other enterprise establishments, as well as in various outdoor settings.

Multiple lighting devices are often utilized to provide general illumination to an entire region, such as an entire floor of an office or commercial establishment. Traditionally, such lighting devices are distributed in a pattern across the ceiling of the region under illumination. These lighting devices may include broad, generally planar structures, such as optical diffusers, which reflect a large portion of any sound generated in the region under illumination. In installations with substantial space between the lighting devices, the intervening spaces often tend to deaden sound a reduce impact of sound reflection off of the planar structures of the lighting devices.

SUMMARY

There may be room for improvement in the use of lighting devices to produce light while also reducing noise in the region, for example, in installations with reduced separation between lighting devices. The concepts disclosed herein improve over the art by providing lighting devices which include structures for reducing noise in the area illuminated by the lighting device.

One such concept includes a lighting device comprising a housing, a light source, and a panel. The light source is mounted within the housing and configured to emit light sufficient for general illumination of an area. The panel is supported by the housing at a location to receive light from the light source at one or more light input surfaces of the panel and output the light received from the light source via a light output surface of the panel facing the area. The light propagates within material of the panel from the one or more light input surfaces to the light output surface. The housing may include a housing surface facing the area, which may be formed on a bezel or a casing of the housing. The light output surface of the panel comprises a noise reduction structure.

The panel may be a light guide having a major surface bounded by lateral edges. In this case, the major surface defines the light output surface of the light guide, the lateral edges define light input surfaces of the light guide, and the light source supplies light to one or more of the lateral edges of the light guide, with the light guide allowing light to propagate within the light guide and exit via the major surface of the light guide. Alternatively, a diffuser may be coupled to the major surface of the light guide to serve as the light output surface of the panel.

The noise reduction structure may take a number of different forms, including a convex curved surface, a plurality of openings formed in a surface, a plurality of parallel slots, or a plurality of holes, for example. The noise reduction structure may take the form of an acoustic diffuser, such as a Helmholtz resonator or a Schroeder diffuser.

Another concept incudes a lighting device comprising a housing, a light source, and a panel. The light source is mounted within the housing and configured to emit light for general illumination of an area. The panel is supported by the housing at a location to output light from the light source via a planar light output surface of the panel facing the area. The housing includes a bezel surrounding the panel and having a bezel surface facing the area. The bezel surface defines a plane, and the planar light output surface is oriented at an oblique angle relative to the plane defined by the bezel surface.

Another concept includes a lighting device comprising a housing, a light source, a panel, and at least one noise damping structure. The light source is mounted within the housing and configured to emit light for general illumination of an area. The panel is supported by the housing at a location to output light from the light source via a light output surface of the panel. The housing includes a casing and a bezel surrounding the panel and coupled to the casing. The noise damping structure is configured to dampen a transmission of vibration between at least one of (i) the panel and the housing and (ii) the bezel and the casing. The noise damping structure may be formed, for example, from a vinyl material or a polymer material.

Another concept includes a lighting device comprising a housing, a light source, and a panel. The light source is mounted within the housing and configured to emit light sufficient for general illumination of an area. The panel is supported by the housing at a location to receive light from the light source at one or more light input surfaces of the panel and output the received light via a light output surface of the panel facing the area. The housing includes at least one surface positioned on a side of the panel opposite the area. The at least one surface of the housing comprises a noise reduction structure.

The housing may include a casing and a bezel surrounding the panel and coupled to the casing. In this example, the casing may form the at least one surface of the housing, with the panel being positioned between the at least one surface of the housing and the area. The noise reduction structure may take a number of different forms, as set forth above.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1A:
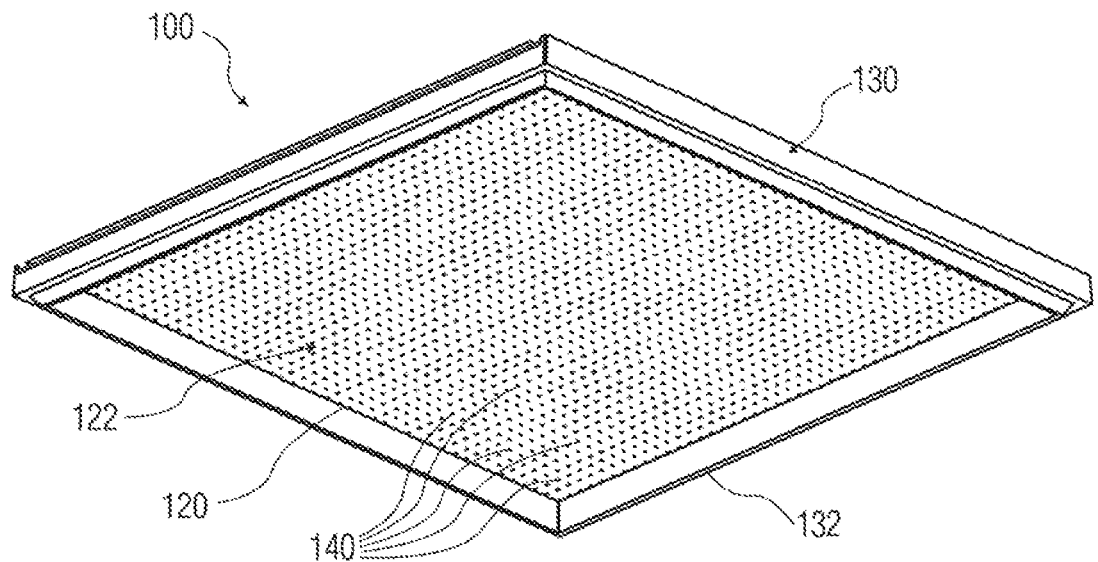
FIG. 1A is a perspective view (e.g. as if viewed from a space to be illuminated) of a lighting device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

As lighting systems for general illumination become more sophisticated, variable, and tunable, some systems are incorporating an increasing number and/or density of lighting devices in a given area. In some examples, an entire ceiling of an area may be replaced by an array of contiguous lighting devices. The increase in number or density of lighting devices, as well as the use of contiguous lighting devices, results in the removal of other ceiling surfaces, such as conventional ceiling tiles, which previously performed some noise reduction function. Typical lighting devices in densely packed arrangements replace these tiles with large, reflective surfaces which lack the noise reduction functionality of the removed ceiling tiles. Thus, these lighting systems may create an issue with increasing an amount of perceived or actual noise in an area under illumination.

The concepts disclosed herein improve over the art by providing lighting devices that serve the added function of reducing noise in the area illuminated by the lighting device. Noise reduction may be performed, for example, by redirecting, diffusing, dissipating, and/or absorbing incoming sound. The disclosed examples may be effective to reduce noise in an area immediately below the lighting device, or in an area within a predetermined distance of the lighting device. The disclosed examples may have a noise reduction coefficient (NRC) of at least 0.1, 0.2, 0.3, 0.4, 0.5, 0.6, 0.7, 0.8, or 0.9 at a desired frequency range or band, dependent on the size and configuration of noise reduction structures.

The detailed description below and the accompanying drawings disclose examples of lighting devices employing various types and configurations of noise reduction structures.

The lighting devices under consideration here may be applied to any indoor or outdoor region or space that requires at least some illumination. The lighting equipment involved here may provide the main illumination component in the space, rather than ancillary light output as might be provided by a display, or by or in association with a sound system, or the like. Alternatively, lighting equipment involved here may provide the main illumination component together with a display functionality. In either case, the illumination from one or more of the fixtures, lamps, luminaires, daylighting equipment or other types of lighting devices is the main illumination that supports the purpose of the space, for example, the lighting that provides illumination sufficient to allow occupants in the space to perform the normally expected task or tasks associated with the planned usage of the space. Herein, such lighting is referred to as "general" lighting or "general" illumination.

The term "lighting device" as used herein is intended to encompass essentially any type of device that processes, generates, or supplies light, for example, for general illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition to light provided for an organism. It is also possible that one or more lighting devices in or on a particular premises have other lighting purposes, such as signage for an entrance or to indicate an exit. Of course, the lighting devices may be configured for still other purposes, e.g. to benefit human or non-human organisms or to repel or even impair certain organisms or individuals. In most examples, the lighting device(s) illuminate a space or area of a premises to a level useful for a human in or passing through the space, e.g. regular illumination of a room or corridor in a building or of an outdoor space such as a street, sidewalk, parking lot or performance venue. The actual source of light in or supplying the light for a lighting device may be any type of light emitting, collecting or directing arrangement.

Suitable lighting devices which may employ or may be modified to employ the concepts disclosed herein may be found in U.S. patent application Ser. No. 15/424,208, entitled "LUMINAIRE AND LIGHTING SYSTEM, COMBINING TRANSPARENT LIGHTING DEVICE AND DISPLAY COUPLED TO OUTPUT IMAGE VIA THE TRANSPARENT LIGHTING DEVICE," filed Feb. 3, 2017, the contents of which are incorporated herein by reference in their entirety.

The term "noise reduction structure" as used herein refers to any physical structure which formed and configured for the sole or primary purpose of passively reducing noise generating by incoming sound waves. Noise reduction structures may reduce noise, for example, by redirecting, diffusing, dissipating, and/or absorbing incoming sound. Examples of noise reduction structures include surfaces which angle incoming sound waves in a direction away from the source of the sound wave, structures which lower sound intensity by diffusing sound waves to a larger area, openings which receive and/or confine sound waves, and structures that absorb and/or dissipate sound energy. While many structures and/or surfaces may inherently be capable of performing one or more of the recited functions to a limited extent, noise reduction structures of the present invention perform the function of reducing noise as their sole or primary purpose, e.g., are designed principally to perform a noise reduction function. The size, shape, number, and/or dimension of noise reduction structures described herein may be selected based on the desired degree of noise reduction in the area under illumination, and/or based on the desired frequency range or band of noise reduction.

The term "coupled" as used herein refers to any logical, physical, optical or electrical connection, link or the like by which forces, energy, signals or other actions produced by one system element are imparted to another "coupled" element. Unless described otherwise, coupled elements or devices are not necessarily directly connected to one another and may be separated by intermediate components, elements or communication media that may modify, manipulate or carry the signals. The "coupled" term may apply to either one or both of optical coupling and electrical coupling. For example, a light emitter or sensor may be optically coupled to a lens or the like, whereas a processor or the like may be coupled to control and/or exchange instructions or data with a light emitter or sensor or with other elements of a device or system via electrical connections, optical connections, electromagnetic communications, etc.

Figure 1B:
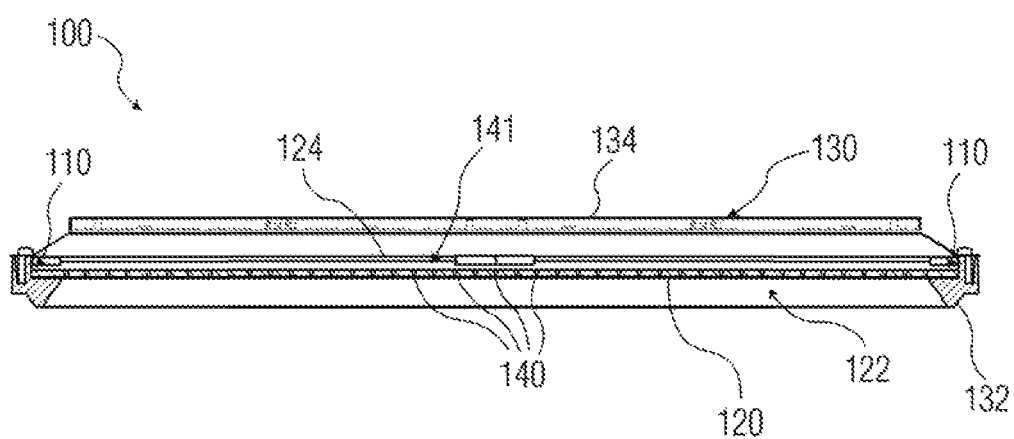
FIG. 1B is cross-sectional side view of an example of the lighting device of FIG. 1A.

Reference now is made in detail to the examples illustrated in the accompanying drawings and discussed below. FIGS. 1A and 1B illustrate an example of a lighting device 100. As a general overview, lighting device 100 includes a light source 110, a panel 120, a housing 130, and at least one noise reduction structure. Additional details regarding lighting device 100 are set forth below.

Light source 110 is mounted within housing 130, and is configured to emit light to illuminate an area, e.g., an area below lighting device 100. Virtually any source of light may be used for light source 110. If lighting device 100 is a luminaire, light source 110 may be configured to emit light of intensity and other characteristics appropriate for artificial general illumination. A variety of suitable light generation sources are indicated below.

Suitable light generation sources for use as light source 110 include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used to implement the light source 110.

Light source 110 may include a single emitter to generate light, or may combine light from some number of emitters to generate the light. A lamp or 'light bulb' is an example of a single source; an array of LEDs is an example of multiple light emitters. An LED light engine may provide a single output for a single source but typically combines light from multiple LED type emitters within the single engine.

Panel 120 is supported by housing 130, and is configured to receive light from light source 110 at one or more light input surfaces of panel 120, and output the received light from light source 110 via one or more light output surfaces of panel 120 to the area to be illuminated by lighting device 100. Panel 120 may be formed from any desired material which allows the light from light source 116 to illuminate the area. For example, panel 120 may be formed from material which allows light from light source 110 to propagate within the material of panel 120 from the light input surface(s) to the light output surface(s). Panel 120 may be transparent, translucent, diffusive, or may filter light from light source 110.

Panel 120 defines a light output surface 122 facing the area under illumination. The light output surface 122 extends over at least a portion of lighting device 100. Where light output surface 122 is defined by a major surface of panel 120, light output surface 122 may cover all or substantially all of the area of lighting device 100. In some examples, the light output surface 122 has a planar shape, as shown in FIGS. 1A and 1B. The light output surface 122 may have other shapes based on the arrangement of light source 110, the desired pattern of illumination provided by lighting device 100, or as further described herein.

In one example, panel 120 comprises a light guide which receives and guides light from light source 110 with minimal loss or absorption, as shown in FIGS. 1A and 1B. The light guide has a major surface facing the area under illumination. The major surface is bounded by lateral edges, e.g., four edges for a rectilinear light guide. In this example, the major surface of the light guide defines a light output surface of the light guide, and the lateral edges of the light guide define light input surfaces of the light guide. Light source 110 is coupled to supply light to one or more of the lateral edges of the light guide, and the light guide is configured to allow light to propagate within the light guide and exit via the major surface of the light guide. The major surface of the light guide may thereby form the light output surface 122 of panel 120. In this example, panel 120 may be formed from any suitable waveguide material, such as glass, plastic, or acrylic.

In a further example, which may be combined with the light guide described above, panel 120 comprises an optical diffuser. The optical diffuser may be coupled to or integrally formed with the major surface of the light guide. The optical diffuser diffuses and softens light from light source 110. The optical diffuser may be formed from any suitable material for diffusing light, such as, for example, acrylic material.

The optical diffuser of this example may be positioned below the light guide, and thereby receive light exiting the light guide. The diffuser may receive the light from the light guide at one or more light input surfaces, and may further define the light output surface 122 on a surface of the diffuser facing the area under illumination. Alternatively, the optical diffuser may be provided between light source 110 and the light guide, to diffuse light prior to the light being received by the one or more input surfaces of the light guide.

In the above examples incorporating a light guide, lighting device 100 may further include a display 124 mounted within the housing at a location to supply image light to another light input surface of panel 120, e.g., a surface of the light guide substantially opposite the major surface. The image light from display 124 may then pass through the light guide and exit the light guide via the major surface of the light guide. Suitable displays for use in lighting device 100 are known.

Housing 130 is configured to house light source 110 and panel 120. Housing 130 may include, for example, a light socket for receiving and/or holding light source 110, and/or may include electrical connections for providing power and/or control signals to light source 110. Housing 130 may have any size suitable for accommodating the desired light source 110, and/or based on the desired illumination requirements or goals of lighting device 100. Housing 130 may further include a bracket, frame, mount, or other structure for receiving and holding panel 120. Housing 130 may house other components of lighting device 100, such as controllers, drivers, power sources, circuitry, and other known lighting device components.

In one example, housing 130 includes a bezel 132 and a casing 134, as shown in FIGS. 1A and 1B. Bezel 132 surrounds and holds panel 120. Casing 134 is positioned overtop the internal components of lighting device 100. Suitable materials for forming bezel 132 and/or casing 134 include, for example, aluminum, steel, zinc, or plastic (for both), as well as sheet metal (for casing 134). Suitable processes for forming bezel 132 and/or casing 134 include, for example, machining, casting, or molding.

Housing 130 may define a housing surface facing the area under illumination. The housing surface may be provided on a portion of housing 130 which faces the area unobstructed, e.g. on bezel 132, or may be provided on a portion of housing 130 which faces the area through an obstruction, e.g., on a portion of casing 134 which is behind panel 120. It will be understood that in some embodiments, lighting device 100 may not include a bezel, and panel 120 may extend to the peripheral edges of lighting device 100. In such embodiments, the housing surface would be formed on a portion of the housing which is behind panel 120.

Noise reduction structure(s) may be formed on one or both of the light output surface and the housing surface. Noise reduction structures passively reduces noise in the area under illumination by lighting device 100. Noise reduction structures may be integrally formed with panel 120 or housing 130, or may be formed on separate materials which are affixed or adhered to panel 120 or housing 130.

The size, shape, number, and/or dimension of noise reduction structures described herein may be selected based on the desired degree of noise reduction in the area under illumination, and/or based on the desired frequency range or band of noise reduction. In one example, the noise reduction structures of lighting device 100 reduce noise in an area immediately below the lighting device, or in an area within a predetermined distance of the lighting device. The noise reduction structures may reduce a volume or intensity of noise in the area under illumination within a desired frequency range or band, and/or may reduce a predetermined amount of noise in the area under illumination.

A variety of non-limiting examples of noise reduction structures are described herein. It will be understood that any number of examples of noise reduction structures could be combined in a single lighting device 100.

Noise reduction structures may comprise openings formed in the light output surface or the housing surface. As shown in FIGS. 1A and 1B, the openings may be holes (or perforations) 140 which are formed in a surface of panel 120. Holes 140 may be arranged in predetermined positions, e.g., as part of an array, or may be positioned randomly or pseudo-randomly. Holes 140 may have a size, shape, and depth specifically selected to promote diffusion, absorption, and/or dissipation of incoming sound waves. In one example, holes have a circular cross-section with a diameter of from 0.5 to 0.9 mm.

Holes 140 may extend partly through panel 120, or may extend all of the way through panel 120. In the latter example, holes 140 may be coupled with a cavity defined in the housing on a side of panel 120 opposite the area under illumination. As shown in FIG. 1B, holes 140 may be in communication with a cavity 141 defined between panel 120 and light source 110. Cavity 141 may have a depth of from 1 to 2 mm. Coupling holes 140 to cavity 141 may further promote noise reduction by creating a larger volume within housing 130 for receiving and dissipating sound energy.

In a particular example, holes 140 and cavity 141 may be configured to act as a Helmholtz resonator. A Helmholtz resonator or Helmholtz oscillator is a container of gas (usually air) with an open hole (or neck or port). A Helmholtz resonator is created when air resonates in a cavity, for example, due to air blown over the top of a bottle/cavity. The air in the neck or opening has a discrete mass, the air in the cavity will act like a spring. During oscillation, the gas in the cavity is alternately compressed and expanded at very low magnitudes. The inertia of the air in the neck/opening plays an important role. The resonant frequency is controlled by length of the neck/opening, cross-sectional area of the neck/opening, and the volume of the cavity. The design of a Helmholtz resonator can be done by trial and error, e.g. using variable size necks/openings and cavities, or by using a fluid dynamic program. The resonant frequency of a Helmholtz resonator may be proportional to the speed of sound and the square root of the cross section of the neck or opening, divided by the product of the cavity volume and neck length. In this example, when receiving incoming sound waves, a volume of air in cavity 141 and near the open hole(s) 140 may vibrate due to the 'springiness' of the air inside cavity 141. The size of holes 140 and cavity 141 may be selected based on the desired frequency of sound to be trapped within the Helmholtz resonator.

Figure 2:
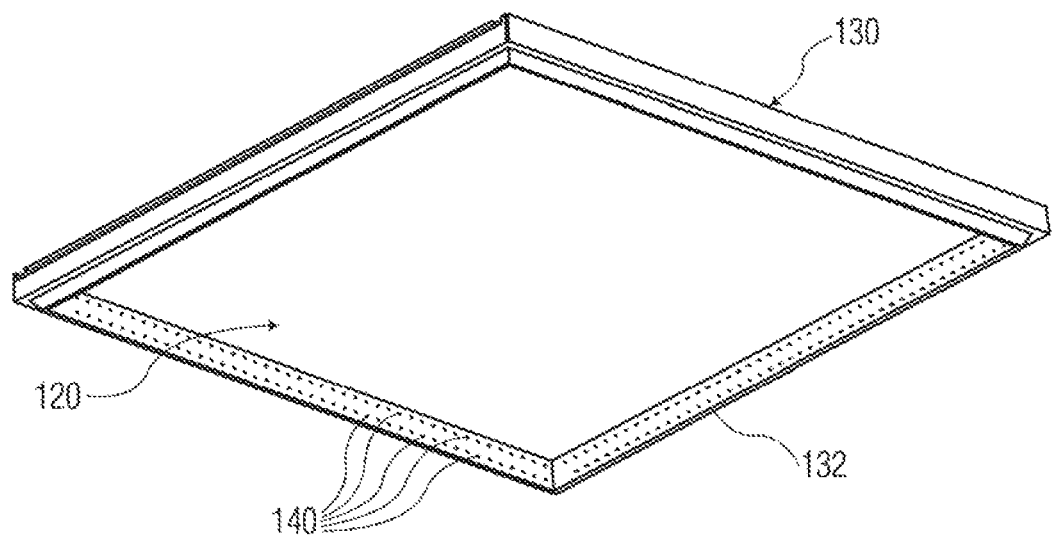
FIG. 2 is a view of an example of a noise reduction structure.

As shown in FIG. 2, the openings may be holes 140 which are formed in a surface of bezel 132. Holes 140 may have any of the features set forth above. Holes 140 may be arranged in predetermined positions, e.g., as part of an array, or may be positioned randomly or pseudo-randomly. Holes 140 may have a size, shape, and depth specifically selected to promote diffusion, absorption, and/or dissipation of incoming sound waves. Holes 140 may extend partly through bezel 132, or may extend all of the way through bezel 132, and in such examples, may be coupled with a cavity positioned behind the housing surface.

Figure 3:
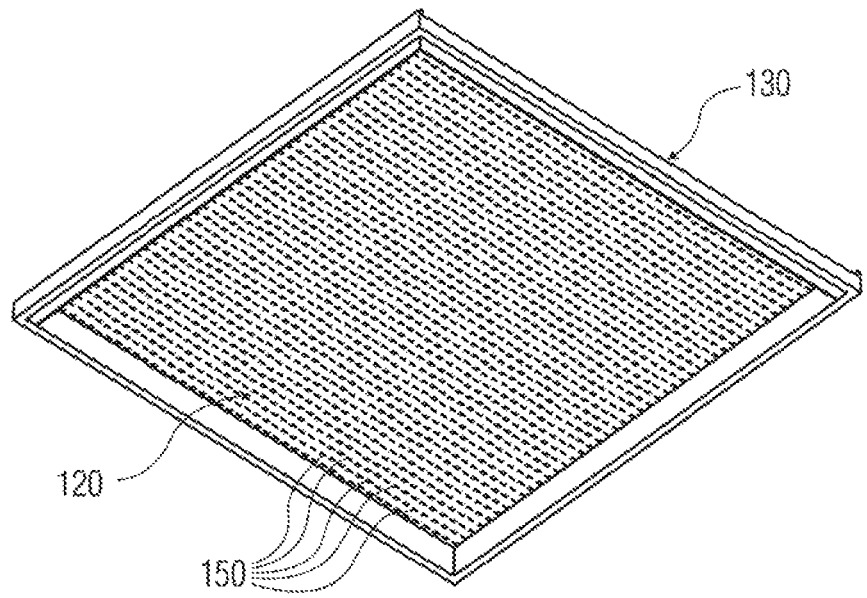
FIG. 3 is a view of another example of a noise reduction structure.

As shown in FIG. 3, the openings may be slots 150 formed in a surface of panel 120. Slots 150 are arranged in a parallel fashion covering the light output surface. Slots 150 may be arranged with predetermined spacing, or may be positioned randomly or pseudo-randomly. Slots 150 may have a size, shape, and depth specifically selected to promote diffusion, absorption, and/or dissipation of incoming sound waves. In one example, slots 150 may have a width corresponding to a positive integer multiple of half a wavelength of the noise to be damped. In a particular example, slots 150 may be configured as a Helmholtz resonator, as described above.

Figure 4A:
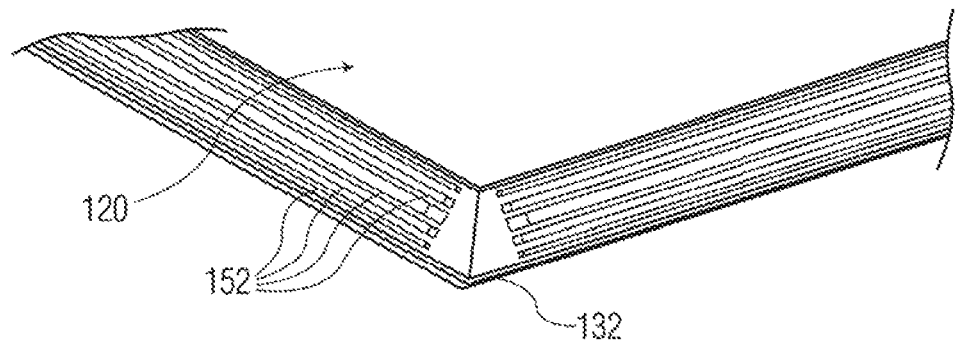
FIGS. 4A and 4B are views of another example of a noise reduction structure.
Figure 4B:
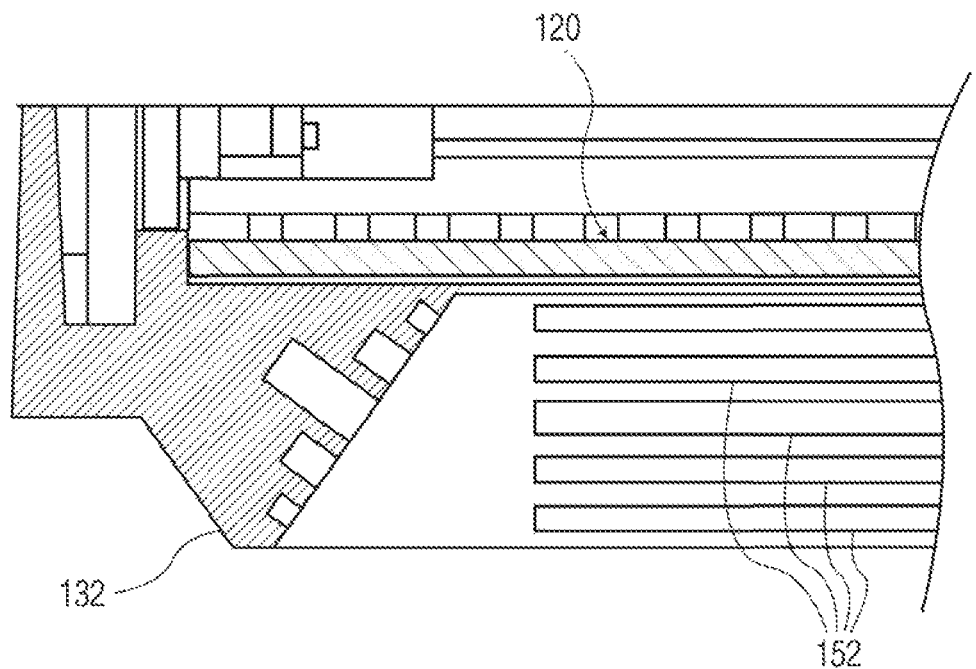

As shown in FIGS. 4A and 4B, the openings may be channels 152 formed in a surface of bezel 132. Channels 152 are arranged in a parallel fashion along the surface of bezel 132. Channels 152 may be arranged with predetermined spacing, or may be positioned randomly or pseudo-randomly. Channels 152 may have a size, shape, and depth specifically selected to promote diffusion, absorption, and/or dissipation of incoming sound waves. In one example, channels 152 may have a width corresponding to a positive integer multiple of half a wavelength of the noise to be damped.

Figure 5A:
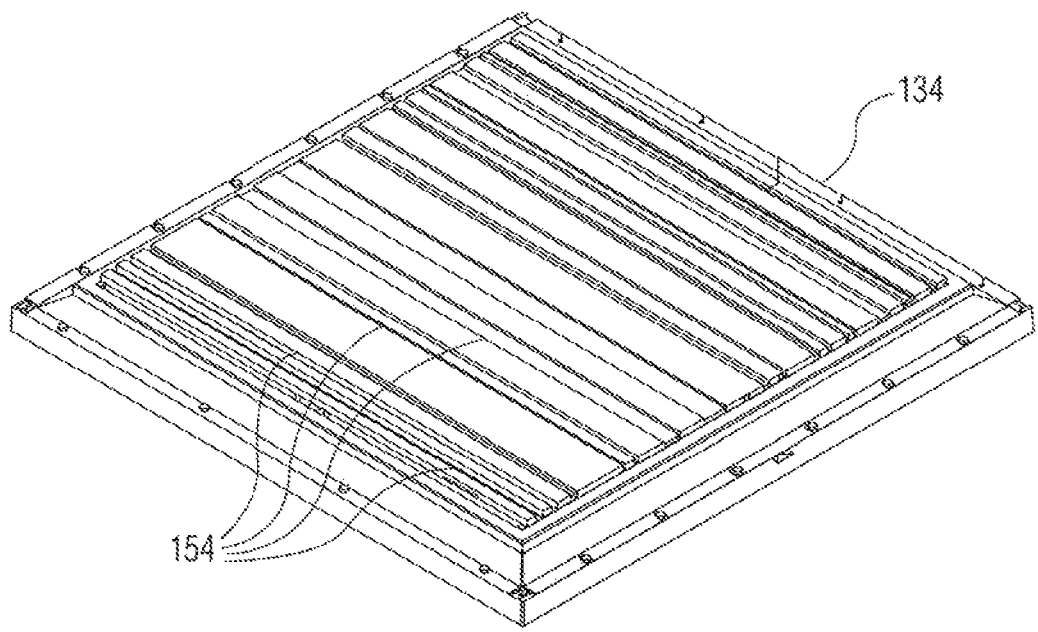
FIGS. 5A and 5B are views of another example of a noise reduction structure.
Figure 5B:
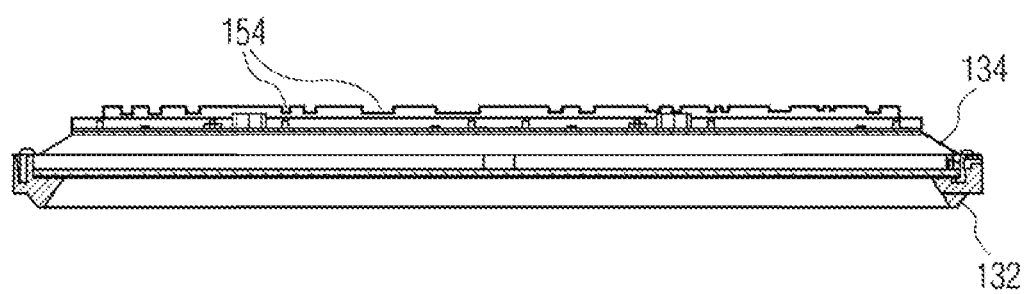

As shown in FIGS. 5A and 5B, the openings may be channels 154 formed in a surface of casing 134. Channels 154 are arranged in a parallel fashion cover the surface of casing 134. Channels 154 may have any of the features set forth above with respect to channels 152. Channels 154 may be arranged with predetermined spacing, or may be positioned randomly or pseudo-randomly. Channels 154 may have a size, shape, and depth specifically selected to promote diffusion, absorption, and/or dissipation of incoming sound waves. In one example, channels 154 may have a width corresponding to a positive integer multiple of half a wavelength of the noise to be damped.

Figure 6:
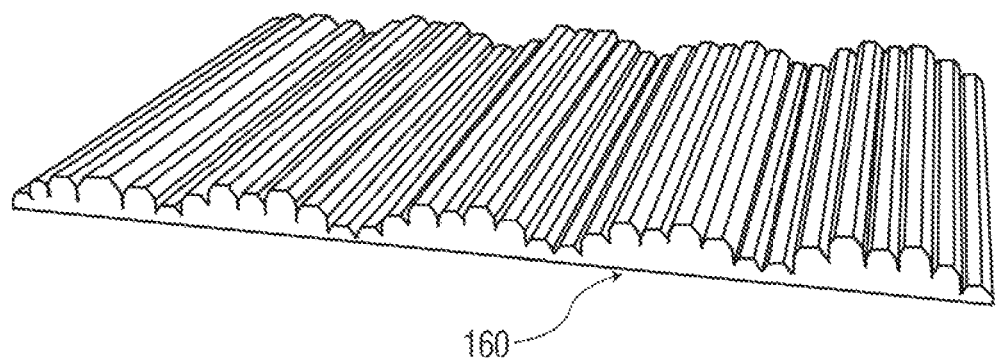
FIG. 6 is a view of another example of a noise reduction structure.
Figure 7:
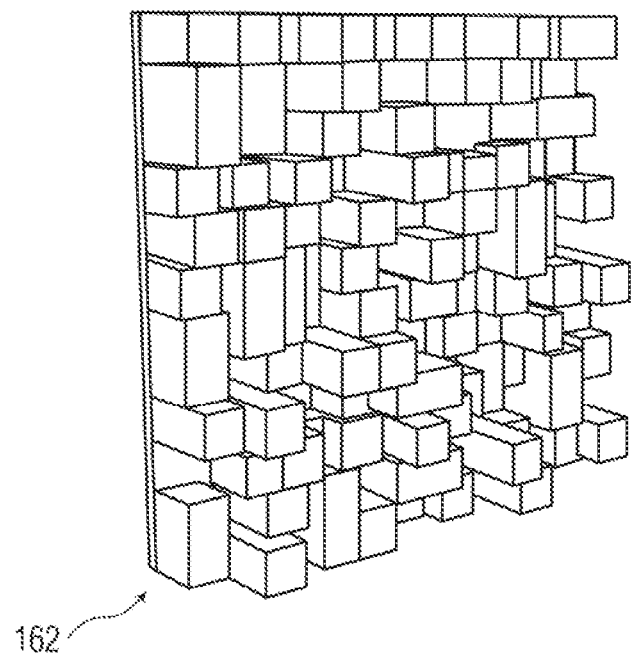
FIG. 7 is a view of another example of a noise reduction structure.

In addition to openings in the light output surface or housing surface, noise reduction structures may comprise projections in the light output surface and/or housing surface, or combinations of openings or projections in the light output surface and/or housing surface. Similarly to the holes, the projections may have a size, shape, and height specifically selected to promote diffusion, absorption, and/or dissipation of incoming sound waves. In one example, an array of projections may be provided, e.g., in order to form an acoustic frequency absorber. In other examples, the projections may form an acoustic diffuser, such as a Schroeder. The noise reduction structure may be provided as a one-dimensional acoustic diffuser 160, as shown in FIG. 6, or as a two-dimensional acoustic diffuser 162, as shown in FIG. 7. The design and formation of a suitable acoustic diffuser or frequency absorber will be understood to those of ordinary skill in the art.

Acoustic diffusers interrupt discrete echoes by scattering or diffusing sound energy over a wide area without removing it from the room, rather than eliminating the sound reflections, as a frequency absorber would. This may maintain sound clarity and improves speech intelligibility. The width of the strips of a diffuser may be smaller than or equal to half the wavelength of the frequency of sound where the maximum scattering effect is desired. Ideally, small vertical walls are placed between lower strips, improving the scattering effect in the case of tangential sound incidence. The bandwidth of these devices may practically be limited to within approximately one octave of the designed frequency of diffusion; at one octave above the design frequency, the diffusor efficiency may drop to close to that of a flat surface.

A quadratic diffuser (as shown in FIG. 7) may comprise a series of wells or troughs that are of different depths. The width of the wells of the diffuser may be smaller than or equal to half the wavelength of the frequency of sound where the maximum scattering effect is desired, whereas the depth of the wells may be a positive integer multiple of a quarter of the wavelength of the frequency of sound where the maximum scattering effect is desired. A series of different depths can be calculated and designed to diffuse frequencies from 100 Hz. up though 4,000 Hz, for example, or even higher. In one example, a series of well depths for a quadratic diffuser may be based upon prime numbers. The prime number chosen is used to produce a series of numbers that correspond to the different well or trough depths. The larger the prime number, the more frequencies that are built into the sequence, resulting in a larger unit which diffuses more frequencies.

Figure 8:
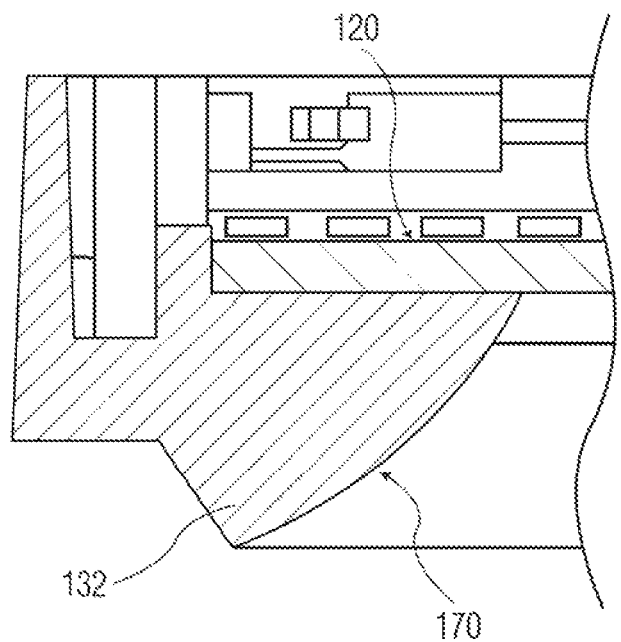
FIG. 8 is a view of another example of a noise reduction structure.

Additionally, the shape of the light output surface and/or housing surface itself may form the noise reduction structure. As shown in FIG. 8, the noise reduction structure may be a convex, curved surface 170 of bezel 132. This convex surface may be configured to reflect incoming sound waves in directions away from the source of the sound wave, thereby reducing noise in the area.

Additional examples of noise reduction structures for use in the disclosed examples may be found, for example, in U.S. Pat. No. 7,677,359, issued Mar. 16, 2010, entitled "Sound absorbent," the contents of which are incorporated herein by reference in their entirety and for all purposes.

Figure 9:
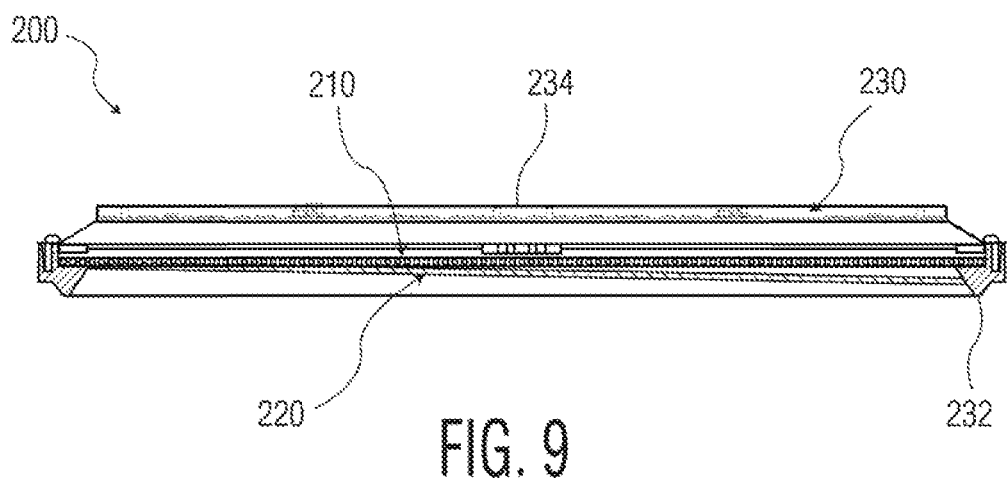
FIG. 9 is cross-sectional side view of another example of a lighting device.

FIG. 9 illustrates another example of a lighting device 200. As a general overview, lighting device 200 includes a light source 210, a panel 220, a housing 230, and at least one noise reduction structure. Additional details regarding lighting device 200 are set forth below.

Light source 210 is configured to emit light to illuminate an area, e.g., an area below lighting device 200. Light source 210 may be any light source described above with respect to light source 110.

Panel 220 is positioned between light source 210 and the area to be illuminated by lighting device 200. Panel 220 may be formed from any material described above with respect to panel 120. Panel 220 defines a planar light output surface facing the area under illumination, as shown in FIG. 9.

Housing 230 is configured to house light source 210 and panel 220. Housing may have any structure described above with respect to housing 130, and may house any of the components set forth above with respect to housing 130. Housing 230 includes a bezel 232 and a casing 234, as shown in FIG. 9. Bezel 232 surrounds and holds panel 220. Casing 234 is positioned overtop the internal components of lighting device 200.

Bezel 232 defines a bezel surface facing the area under illumination. The bezel surface defines a plane, and may be configured to be parallel to the surface in which lighting device 200 is mounted, e.g., the bezel surface may be parallel to the ceiling of the area under illumination.

In lighting device 200, the noise reduction structure is formed by panel 220. Panel 220 performs noise reduction by redirecting sounds away from the area under illumination. In particular, the planar surface of panel 220 is oriented at an angle relative to the plane defined by the bezel surface. The angle of panel 220 may be selected so as to reduce noise without interfering with the illumination provided by light source 210. The angle of panel 220 may be selected so as to not be visually noticeable to a person in the area under illumination. In one example, the angle of the surface of panel 220 relative to the surface of bezel 232 may be an oblique angle, e.g., in the range of one to four degrees.

Figure 10:
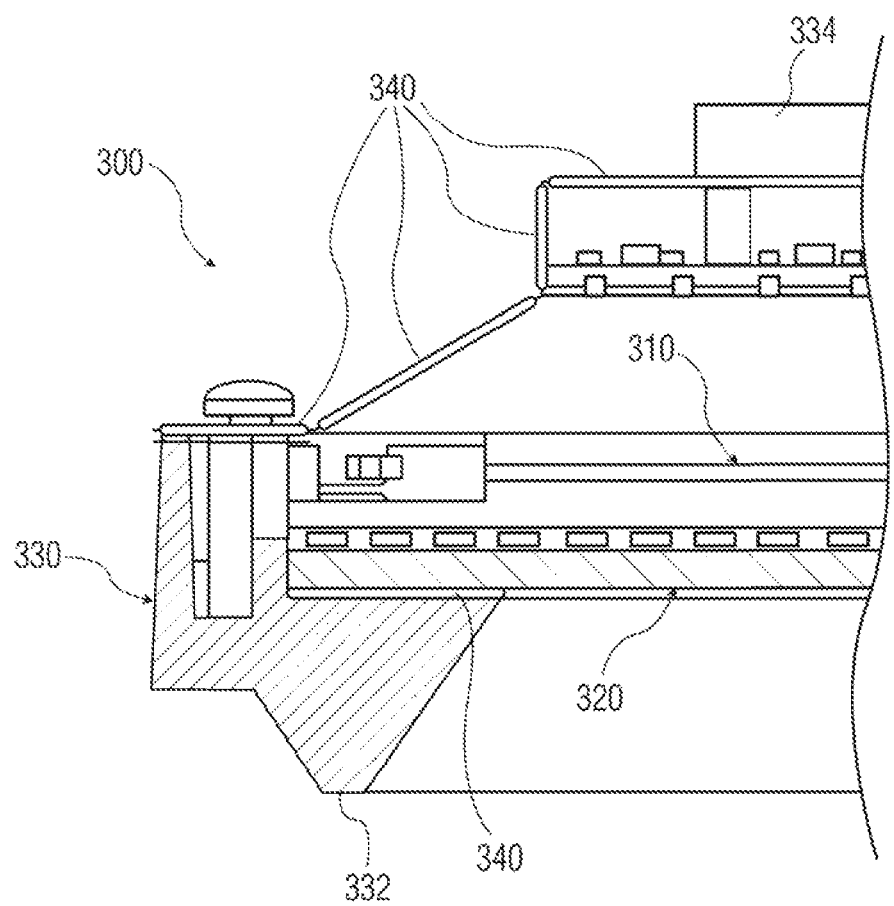
FIG. 10 is cross-sectional side view of yet another example of a lighting device.

FIG. 10 illustrates another example of a lighting device 300. As a general overview, lighting device 300 includes a light source 310, a panel 320, a housing 330, and at least one noise reduction structure. Additional details regarding lighting device 300 are set forth below.

Light source 310 is configured to emit light to illuminate an area, e.g., an area below lighting device 300. Light source 310 may be any light source described above with respect to light source 110.

Panel 320 is positioned between light source 210 and the area to be illuminated by lighting device 200. Panel 320 may be formed from any material described above with respect to panel 120.

Housing 330 is configured to house light source 310 and panel 320. Housing may have any structure described above with respect to housing 130, and may house any of the components set forth above with respect to housing 130. Housing 330 includes a bezel 332 and a casing 334, as shown in FIG. 10. Bezel 332 surrounds and holds panel 320. Casing 334 is positioned overtop the internal components of lighting device 300.

In light device 300, noise reduction structures are noise damping structures 340 which are provided between the components of lighting device 300. Noise damping structures 340 passively reduce noise in the area under illumination by absorbing and dissipating the energy from sound waves which impact lighting device 300, in order to dampen the transmission of vibrations between the components of lighting device 300.

Noise damping structures 340 may be layers of material provided, for example, between panel 320 and housing 330, and/or between bezel 332 and casing 334. Noise damping structures 340 may be provided between any other components for which it would be desirable to reduce or minimize the transmission of vibrations. Noise damping structures 340 are not limited to being provided between components, but may also be coupled to the surface of components, such as housing 330, as shown in FIG. 10. Suitable materials for forming noise damping structures 340 will be known, and may include elastomeric materials such as vinyl materials, polymer materials, and foams, as well as fibrous materials such as mineral wool, wool, cotton fibers, wood fibers, or synthetic fibers, or asphalt materials, for example.

Lighting devices 100, 200, 300 may be used as standalone lighting devices or as part of a system of lighting devices. In one example, a system of lighting devices is provided with each lighting device including the components described above for lighting device 100, 200, and/or 300. It will be understood that such a system could include any number of lighting devices as desired to adequately illuminate the region in which the system is located. In such a system, the lighting devices may cooperate to reduce noise in an entire region under illumination.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A lighting device, comprising:
   a housing;
   a light source mounted within the housing and configured to emit light sufficient for general illumination of an area; and
   a panel supported by the housing at a location to receive light from the light source at one or more light input surfaces of the panel and output the received light via a light output surface of the panel facing the area, the light propagating within material of the panel from the one or more light input surfaces to the light output surface,
   wherein the light output surface of the panel comprises an acoustic noise reduction structure.

2. The lighting device of claim 1, wherein the panel comprises a light guide having a major surface bounded by lateral edges, the major surface defining the light output surface, at least one of the lateral edges defining the one or more light input surfaces.

3. The lighting device of claim 1, further comprising a light guide having a major surface bounded by lateral edges, wherein the panel comprises a diffuser coupled to the major surface of the light guide, a surface of the diffuser defining the light output surface of the panel.

4. The lighting device of claim 1, further comprising a display mounted within the housing at a location to supply image light to another one of the one or more light input surfaces of the panel, the other one of the one or more light input surfaces being substantially opposite the light output surface of the panel.

5. The lighting device of claim 1, wherein the housing comprises a bezel surrounding the panel, and the bezel comprises a further noise reduction structure.

6. The lighting device of claim 5, wherein the further noise reduction structure comprises a convex curved surface of the bezel.

7. The lighting device of claim 1, wherein the noise reduction structure comprises a plurality of openings formed in the light output surface.

8. The lighting device of claim 7, wherein the plurality of openings comprises a plurality of parallel slots.

9. The lighting device of claim 7, wherein the plurality of openings comprises a plurality of parallel channels arranged to form a Schroeder diffuser.

10. The lighting device of claim 7, wherein the plurality of openings comprises a plurality of holes, the plurality of holes in communication with a cavity defined in the housing on a side of the panel opposite the area.

11. The lighting device of claim 1, wherein the noise reduction structure comprises an acoustic diffuser.

* * * * *